United States Patent [19]

Luly

[11] Patent Number: 5,416,530
[45] Date of Patent: May 16, 1995

[54] VIDEO SIGNAL NOISE REDUCTION CIRCUIT FOR A VIDEO DEMODULATOR COMPRISING A PLL

[76] Inventor: Robert A. Luly, 7283 S. Fillmore Cir., Littleton, Colo. 80122

[21] Appl. No.: 992,180

[22] Filed: Dec. 17, 1992

[51] Int. Cl.[6] .............................................. H04N 5/213
[52] U.S. Cl. .................................... 348/607; 348/726; 329/320; 329/326
[58] Field of Search ...................... 358/195.1, 160, 167, 358/23; 329/318, 319, 320, 325, 326; H04N 5/213, 5/445; 348/607, 735, 726, 618

[56] References Cited

U.S. PATENT DOCUMENTS

| | | | |
|---|---|---|---|
| 3,983,488 | 9/1976 | Bush | 329/325 |
| 4,035,730 | 7/1977 | Clayton | 329/321 |
| 4,353,093 | 10/1982 | Durbin | 358/160 |
| 4,479,091 | 10/1984 | Yoshisato | 329/326 |
| 4,514,763 | 4/1985 | Rindal | 358/167 |
| 5,233,425 | 8/1993 | Rabii | 348/735 |

FOREIGN PATENT DOCUMENTS

| | | | |
|---|---|---|---|
| 0004764 | 1/1977 | Japan | 329/325 |
| 0080904 | 5/1983 | Japan | 329/319 |
| 0141208 | 6/1986 | Japan | 329/325 |
| 3174808 | 7/1991 | Japan | 329/318 |
| 0135301 | 3/1985 | United Kingdom | 329/325 |
| 0398351 | 11/1990 | United Kingdom | 329/325 |

Primary Examiner—James J. Groody
Assistant Examiner—Chris Grant
Attorney, Agent, or Firm—Natan Epstein

[57] ABSTRACT

Video noise reduction is achieved by limiting the loop response bandwidth in a phase locked loop demodulator with a high-pass RC network connected between two oppositely phased video signals in the phase detector for out-phasing a high frequency component of the loop response bandwidth. Easy user adjustment allows viewable video images to be obtained from very noisy signals in deep fringe reception areas.

22 Claims, 1 Drawing Sheet

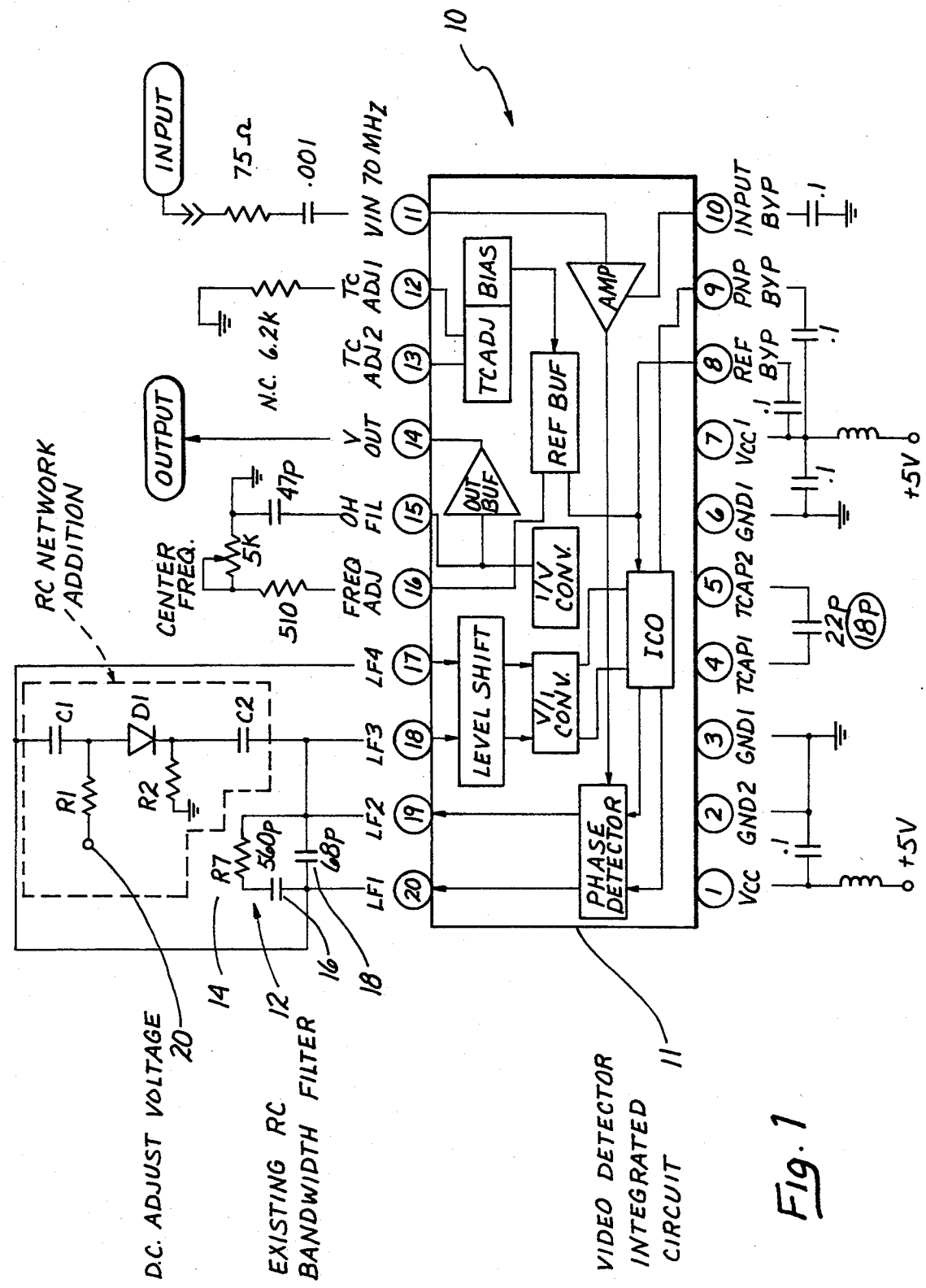

VIDEO SIGNAL NOISE REDUCTION CIRCUIT FOR A VIDEO DEMODULATOR COMPRISING A PLL

BACKGROUND OF THE INVENTION

1. Field of the Invention

This invention relates to improvements in video receiver systems and in particular relates to a modification to the phase locked loop (PLL) circuit of a video tuner/demodulator by which a more viewable picture is obtained from a noisy video signal by reducing bandwidth of the PLL loop response.

2. State of the Prior Art

It is well known that a reduction in the receiver bandwidth ahead of the video demodulator reduces "sparklies" caused by impulse noise present in the video signal being demodulated. Sparklies are flecks superimposed on the picture displayed on a video monitor or television screen, which degrades the quality of the video picture. In areas where the received video signal level is very weak, extraneous impulse noise picked up by the receiving system or produced by the RF amplifier stages of the receiver system may make the video picture unviewable. This is a common condition in fringe television receiving areas.

Video noise reduction (VNR) achieved by bandwidth reduction ahead of the video demodulator results in diminished picture fidelity. This approach to video noise reduction is linear, i.e, picture degradation is proportional to video noise reduction, and can only be carried so far before the picture is degraded too much for viewing. Post demodulation linear filtering of the video signal is also known, but has been found to be even less effective.

One approach to extending the signal to noise (S/N) ratio threshold of an FM video demodulator at which a useful picture is obtained involves the use of a phase locked loop (PLL) demodulator, and is incorporated in commercial receivers, particularly satellite video receivers. One shortcoming of this approach is that PLL demodulators respond in a non-linear manner (all or nothing), i.e. have a large step response, to impulse noise and the PLL momentarily loses lock thereby creating a large black or white spec of noise in the picture, limiting the demodulator's threshold extension capability.

Improvements in this method of video noise reduction are needed.

SUMMARY OF THE INVENTION

According to this invention video noise is reduced in a phase locked loop FM video demodulator circuit of the type having a phase locked loop with a video signal input, a video signal output and means for setting a normal loop response bandwidth of the phase locked loop for a video signal input free of impulse noise. This is accomplished when receiving a video signal at the demodulator input including impulse noise sufficient to substantially degrade a raster picture produced from the received video signal, by limiting the high frequency loop response of the phase locked loop to a loop response bandwidth substantially below the normal loop response bandwidth setting. The bandwidth limiting addition according to this invention is an RC network connected between two oppositely phased signal lines within the phase locked loop. In particular the RC network may include one or more capacitors in series with at least one resistor. Adjustable limitation of the loop bandwidth may be achieved by adjustment of the resistance in the RC network.

In a presently prefered form of the invention, the resistance in the RC network is provided by a low capacitance diode, such as a Schottky or PIN diode, adjustably biased by a control current thereby to control the effective resistance of the diode.

BRIEF DESCRIPTION OF THE DRAWINGS

FIG. 1 shows a typical phase locked loop FM video demodulator circuit modified according to the present invention by addition of the components enclosed in the dotted line box.

DETAILED DESCRIPTION OF THE PREFERRED EMBODIMENTS

With reference to FIG. 1, the drawing shows a phase locked loop circuit generally designated by numeral 10 and built around a commercially available NE568 integrated circuit 11. This particular demodulator circuit is implemented in a satellite television receiver sold by the Uniden Company as their Uniden 2000 model, and also in a receiver sold as model Echostar 45 by Houston Tracker Systems, of Denver, Colo. The demodulator receives at its input an intermediate frequency carrier which in the aforementioned commercial receivers is a 70 Megahertz carrier frequency modulated with the video signal. The output of the demodulator is a baseband video signal, along with any audio subcarriers present in the received FM modulated signal. The phase locked loop demodulator 10 as implemented in prior commercial receivers has an equalizing RC network generally designated by numeral 12 and connected between pins 19 and 20 of the integrated circuit 11, including a 27 ohm resistor 560 pF capacitor 16, and 68 pF capacitor 18. The component values of this equalizing network are selected by the manufacturer to stabilize the PLL under normal receiving conditions where the video signal at the PLL input has little or no impulse noise and is generally a strong clean signal. Under such conditions, the normal equalizing network provides an optimal picture as viewed on a television receiver or monitor connected to the satellite receiver.

According to this invention the loop bandwidth of the PLL demodulator is limited by out phasing the high frequency end of the received video signal passing through the PLL circuit. In a presently preferred form of this invention, this loop bandwidth reduction is achieved with an RC network effectively connected across the output of the onboard phase detector of the PLL IC 11. In the case of the NE568 PLL in FIG. 1, the RC network added according to the modification of this invention comprises components C1, C2, R1, R2 and D1. The values and part numbers for these components are as follows:

C1, C2=0.2 microFarads

R1, R2=470 Ohms

D1=NBD101 Schotky diode or equivalent low capacitance Schotky or PIN diode.

The diode D1 is supplied witch a bias current through resistor R1 at D.C Adj. input 20. The bias current, provided from any convenient source in the receiver, is made adjustable from 0 to 10 milliamps. At zero bias current through R1, the resistance of diode D1 is greater than 100 ohms and the effect of the added RC network is negligible, so that the PLL loop operates at normal equalization and full normal loop bandwidth, for reception of clean video signals at the PLL input. With 10 miliamps supplied at the bias input 20, diode D1 is fully forward biased and offers a resistance of about 25 to 35 ohms. Control over the effective resistance of diode D1 permits adjustment of the phase cancellation between the 180° out-of-phase signals present at pins 19 and 20 of IC 11, which in turn determines the loop bandwidth response of the PLL circuit. The loop response bandwidth is minimized at full bias current through diode D1. Control of the diode bias current can be manual by means of a variable resistance or potentiometer, or can be under microprocessor control via the hand held infrared remote control unit commonly supplied with this type of satellite receiver or television sets.

The effect of limiting the PLL's loop bandwidth response is that the PLL's normal large step response to energetic impulse noise is greatly reduced and the "sparklies" are largely eliminated from the video picture display. Reduction of signal bandwidth, whether outside the PLL or inside the PLL loop causes loss of some high frequency transition response, which shows up in the picture display as edge "tearing", along sharp vertical object edges in the picture. However, by limiting bandwidth inside the PLL loop according to this invention, this high frequency response limitation occurs at a much lower signal-to-noise level of the video signal input, and can be adjusted so that this picture "tearing" is only a small percentage of the total picture. The resulting trade off of some picture degradation in return for a large reduction or elimination of "sparklies" is worthwhile, inasmuch as it can enable reception of a viewable picture in fringe areas where otherwise no viewable reception would be possible. In effect, a subjective improvement in carrier signal to noise ratio of about 4 Decibels is obtainable by the modification to the PLL circuit here described. This gain is equivalent to tripling the size of a dish antenna in a satellite receiving system.

In the past, limitation of the PLL loop bandwidth response was normally avoided as it was believed that it would cause unacceptable loss of the color subcarrier level and other high frequency information present in the received video signal input. It was discovered by this applicant, however that if the color subcarrier level is reduced as a result of the high frequency bandwidth roll-off in the PLL loop response, the color subcarrier level is largely restored by the television receiver set normally used in conjunction with the satellite receiver. Most commercial television sets have automatic gain control circuits which compensate for variations in the color subcarrier level. The remaining high frequency information lost from the video signal by this modification to the PLL demodulator is generally not missed by the average viewer, and the only remaining degradation is the edge tearing on vertical lines of the video picture, which tearing is dependent on picture content, e.g, old faded movies as opposed to live sporting events, the picture tearing being more evident in the latter.

The RC network 12 added to the PLL demodulator in FIG. 1 is electrically equivalent to a single 0.1 microFarad capacitor in series with a 0-100 Ohm variable resistor connected between pins 19 and 20 of the PLL integrated circuit 11. While it is possible to implement the present invention in such a minimal embodiment of a single capacitor/single resistor RC network, difficulties then arise in providing adjustment of the PLL loop bandwidth response to suit the quality of the particular video signal being received at any given time. Such adjustment is desirable, as has been explained, in order to optimize the picture depending on the amount of impulse noise present in the signal, i.e., so that the PLL loop bandwidth is limited only to the degree necessary to reduce the impulse noise sparklies to an acceptable level in the video picture. This can be done by mounting a 0-100 ohm potentiometer on the demodulator circuit board. The shortcomings of this approach are twofold. Firstly, the user must access the interior of the receiver housing with a suitable tool in order to adjust the potentiometer while viewing the received video picture. Secondly, the potentiometer approach becomes completely unworkable as the intermediate frequency (IF) of the satellite receiver increases. At IF frequencies currently in use in Europe, such as 480 Megahertz or 628 Megahertz, the IF signals cannot be controlled by means of a potentiometer due to its inherent high reactance at such frequencies. The RC network 12 implemented with a low capacitance (e.g. 1 picoFarad) diode D1 is usable at IF frequencies in the 600 Megahertz range, and can be readily adapted to convenient remote control, either manual or by a microprocessor, as already explained. The maximum bandwidth of the FM video signal remains the same, i.e. 30 MHz, regardless of the choice of IF frequency. The use of two capacitors C1, C2 isolates the diode bias current from the PLL IC 11. This particular N568 IC is internally DC biased and its operation would be otherwise affected by the diode bias current. The values of R1, R2 are selected to provide the bias current for the diode D1 without loading down the circuit. The effective series resistance of the network 12 is adjustable as described to allow for program content and signal strength. The network 12 added according to this invention is most effective on extremely weak signals and if the received video input signal is sufficiently strong, the added network 12 is unnecessary and would only degrade the quality of the picture. Under such circumstances, the network 12 should be switched off, as by bringing to zero the bias current of diode D1.

While a particular embodiment of the invention has been described and illustrated for purposes of clarity and example, it must be understood that many changes, modifications and substitutions to the described embodiment will become readily apparent to those possessed of ordinary skill in the art, without departing from the scope and spirit of the present invention which is defined by the following claims.

What is claimed is:

1. A video noise reduction method for a video demodulator circuit of the type having a phase locked loop with a modulated video signal input, a demodulated video signal output, a loop response signal and means for setting a normal bandwidth of said loop response signal, comprising the steps of:

providing a noisy video signal at said input, said noisy video signal including impulse noise sufficient to substantially degrade a video image produced from said noisy video signal at said normal bandwidth; and out-phasing a high frequency bandwidth portion of said noisy video signal input by mutual cancellation of out-of-phase signals in said phase locked loop, thereby limiting the high frequency response of said phase locked loop to a restricted loop response bandwidth substantially narrower than the normal loop response bandwidth setting.

2. An improvement for reducing video noise in a video demodulator circuit of the type having a phase locked loop with a video signal input and a video signal output, and means for setting a normal loop response bandwidth of said phase locked loop, said improvement comprising:

frequency selective means connected to said phase locked loop for mutually cancelling a high frequency bandwidth portion of oppositely phased signals in said phase locked loop thereby to limit said phase locked loop to a loop response bandwidth substantially below said normal loop response bandwidth.

3. The improvement of claim 2 wherein said frequency selective means are connected between two oppositely phased outputs of a phase detector in said phase locked loop.

4. The improvement of claim 2 wherein said frequency selective means are adjustable by a viewer of a video image derived from said video signal output for adjusting said mutual cancellation thereby to optimize said video image.

5. The improvement of claim 4 wherein said frequency selective means comprises a low capacitance diode and means for adjustably biasing said diode thereby to control the effective resistance of said diode.

6. An improvement for reducing video noise in a video demodulator circuit of the type having a phase locked loop with a video signal input and a video signal output, and means for setting a normal loop response bandwidth of said phase locked loop, said improvement comprising:

an RC network connected between two oppositely phased outputs of a phase detector in said phase locked loop including adjustable resistance means in said RC network for variably limiting the high frequency response bandwidth of said phase locked loop by phase cancellation of a high frequency bandwidth portion of said oppositely phased outputs to achieve a response bandwidth substantially below said normal loop response bandwidth.

7. The improvement of claim 6 wherein said adjustable resistance means comprises a low capacitance diode and means for adjustably biasing said diode thereby to control the effective resistance of said diode.

8. The method of claim 1 wherein said out-phasing comprises the step of adjusting said high frequency bandwidth portion so as to obtain a subjectively acceptable video image.

9. The method of claim 8 wherein said step of adjusting is performed manually by a viewer of said video image.

10. The method of claim 1 wherein said out-phasing comprises the step of phase cancelling said high frequency bandwidth portion of said out-of-phase signals.

11. The method of claim 1 wherein said restricted loop response bandwidth is such as to significantly degrade a video image derived from a video signal input free of noise to said video demodulator.

12. The improvement of claim 2 further comprising means for manually adjusting a resistance associated with said frequency selective means by a person while viewing a video image derived from said video signal output thereby to subjectively optimize said video image for a given quality of said video signal input.

13. A video noise reduction method for a video demodulator circuit of the type having a phase locked loop with a modulated video signal input, a demodulated video signal output, a loop response signal and means for setting a normal bandwidth of said loop response signal, comprising the steps of:

phase cancelling high frequency bandwidth portions of two out-of-phase video signals in said phase locked loop thereby to substantially reduce the high frequency response of said phase locked loop and to achieve a restricted loop response bandwidth substantially narrower than the normal loop response bandwidth setting.

14. The method of claim 13 further comprising the step of varying said high frequency bandwidth portions so as to obtain a subjectively acceptable video image for a given quality of said video signal input.

15. The method of claim 13 wherein said out-of-phase video signals are oppositely phased outputs of a phase detector of said phase locked loop.

16. The method of claim 13 further comprising the step of adjusting frequency selective means connected between said out-of-phase signals thereby to adjust said high frequency bandwidth portions so as to obtain a subjectively acceptable video image for a given quality of said video signal input.

17. A method for subjectively improving fringe area video reception comprising the steps of:

providing a video demodulator circuit of the type having a phase locked loop with a modulated video signal input, a demodulated video signal output, a loop response signal and means for setting a normal bandwidth of said loop response signal;

phase cancelling a high frequency bandwidth portion of two out-of-phase video signals in said phase locked loop thereby to restrict the loop response bandwidth substantially below the normal loop response bandwidth setting; and adjusting said high frequency bandwidth portion of said out-of-phase video signals to subjectively optimize said video image for a given quality of said video signal.

18. The method of claim 17 wherein said step of adjusting is performed manually by a viewer of said video image.

19. The method of claim 17 wherein said step of adjusting comprises adjusting frequency selective means connected between said out-of-phase signals.

20. The method of claim 19 wherein said adjusting frequency selective means comprises varying a resistance in said frequency selective means.

21. A video demodulator circuit for improved fringe area video signal reception comprising:

a phase locked loop having a video signal input, a video signal output, and means for setting a normal loop response bandwidth of said phase locked loop;

frequency selective means connected to said phase locked loop for mutually cancelling a high frequency bandwidth portion of out-of-phase video signals in said phase locked loop thereby to limit said phase locked loop to a loop response bandwidth substantially below said normal loop response bandwidth; and manually operable means associated with said frequency selective means and adjustable by a viewer of a video image derived from said video signal output to thereby obtain a subjectively optimal video image for a given quality of said video signal input.

22. The circuit of claim 21 wherein said manually operable means comprise variable resistance means connected between said out-of-phase video signals.

* * * * *